(12) United States Patent
Lodico et al.

(10) Patent No.: US 9,421,623 B2
(45) Date of Patent: Aug. 23, 2016

(54) APPARATUS FOR SHARPENING BEET-CUTTER KNIVES

(71) Applicants: Michele Lodico, Hagen (DE); Ruediger Lenz, Ennepetal (DE)

(72) Inventors: Michele Lodico, Hagen (DE); Ruediger Lenz, Ennepetal (DE)

(73) Assignee: PUTSCH GMBH & CO.KG, Hagen (DE)

( * ) Notice: Subject to any disclaimer, the term of this patent is extended or adjusted under 35 U.S.C. 154(b) by 219 days.

(21) Appl. No.: 14/308,939

(22) Filed: Jun. 19, 2014

(65) Prior Publication Data
US 2015/0016912 A1    Jan. 15, 2015

(30) Foreign Application Priority Data
Jun. 26, 2013  (DE) .................. 10 2013 106 659

(51) Int. Cl.
| | |
|---|---|
| *B23C 3/12* | (2006.01) |
| *B24B 3/58* | (2006.01) |
| *A01F 29/22* | (2006.01) |
| *B23C 3/00* | (2006.01) |
| *B23C 7/00* | (2006.01) |
| *B23Q 16/00* | (2006.01) |
| *C13B 5/08* | (2011.01) |
| *B23Q 15/14* | (2006.01) |
| *B23Q 17/22* | (2006.01) |

(52) U.S. Cl.
CPC . *B23C 3/12* (2013.01); *A01F 29/22* (2013.01); *B23C 3/00* (2013.01); *B23C 7/00* (2013.01); *B23Q 16/00* (2013.01); *B24B 3/586* (2013.01); *C13B 5/08* (2013.01); *B23C 2215/00* (2013.01); *B23C 2220/48* (2013.01); *B23C 2270/20* (2013.01); *B23Q 15/14* (2013.01); *B23Q 17/22* (2013.01); *B24B 3/58* (2013.01); *Y10T 409/300896* (2015.01); *Y10T 409/303808* (2015.01); *Y10T 409/306384* (2015.01)

(58) Field of Classification Search
CPC ........ B24B 3/586; B23Q 15/14; B23Q 15/22; B23Q 15/16; B23Q 17/0952; B23Q 17/0904; B23Q 17/22; B23Q 17/2233; Y10T 409/306832; Y10T 409/306888; Y10T 409/307224; Y10T 409/30728; Y10T 409/307336; Y10T 409/306944; Y10T 409/308624
USPC .............. 451/45, 233, 34; 76/88, 89, 89.1, 82
See application file for complete search history.

(56) References Cited

U.S. PATENT DOCUMENTS

| | | | | |
|---|---|---|---|---|
| 2,069,140 | A | * | 1/1937 | Freas ........................ B24B 3/58 451/233 |
| 2,120,096 | A | * | 6/1938 | Hausman .................. B24B 3/55 125/11.15 |

(Continued)

FOREIGN PATENT DOCUMENTS

| | | |
|---|---|---|
| DE | 2449316 A | 10/1975 |
| DE | 2459983 A | 6/1976 |
| GB | 1476269 B | 6/1977 |

*Primary Examiner* — Sunil K Singh
*Assistant Examiner* — Ryan Rufo
(74) *Attorney, Agent, or Firm* — Andrew Wilford (57) ABSTRACT

An apparatus for sharpening a beet knife has a plurality of roof-shaped blades next to each other on a knife body has a centering device carrying a centering piece and movable in a Y-direction, a milling device with a mechanically rotatable side miller with a roof-like milling edge movable in the Y-direction toward and away from the centering device, and a guide extending in an X-direction substantially perpendicular to the Y-direction. A grab shiftable in the X-direction on the guide is designed to hold the knife to be sharpened, and respective drives are connected to the centering and milling devices for moving same toward and away from each other in the Y-direction and to the grab for moving same along the guide in the X-direction.

7 Claims, 9 Drawing Sheets

(56) References Cited

U.S. PATENT DOCUMENTS 3,583,261 A * 6/1971 Sheppard, Jr. ............ B24B 3/58
 409/145

3,956,948 A * 5/1976 Pivont ....................... B24B 3/58
 409/161
4,009,637 A 3/1977 Bittner
2012/0094582 A1* 4/2012 Lytinas ................... B24B 17/00
 451/45

* cited by examiner

APPARATUS FOR SHARPENING BEET-CUTTER KNIVES

FIELD OF THE INVENTION

The present invention relates to an apparatus for sharpening the knife of a root-vegetable-cutting machine. More particularly this invention concerns the knife used to chop or comminute sugar beets.

BACKGROUND OF THE INVENTION

In order to extract sugar from sugar beets, it is necessary to slice them into relatively small strips called cossettes. Such a machine has so-called Koenigsfeld knives with roof-shaped or angularly corrugated cutting edges that comminute the beets. Such beet knives are used in many forms and frequently become dull as a result of their intended use, thus necessitating resharpening. The knife consists of a knife body on which blades are mounted in the manner of a gabled or pointed roof that are arranged next to each other in large numbers. To sharpen them, the beet knives must each be reground on each cutting edge of the gabled roof-shaped blades. This involves substantial work, and this task must be performed with great care, since, on the one hand, the positioning of the cutting edge in the sharpening elements must be done carefully and, on the other hand, the cut depth of the miller must be maintained with precision in order not to cut the knife too much and to impart a sharp chamfered edge to the blade.

A conventional sharpening apparatus of this type can be operated only with great manual effort, and there are numerous sources of errors during sharpening as a result of the manual operation.

OBJECTS OF THE INVENTION

It is therefore an object of the present invention to provide an improved apparatus for comminuting root-vegetables.

Another object is the provision of such an improved apparatus for comminuting root-vegetables that overcomes the above-given disadvantages, in particular that enables the sharpening of beet knives in a practically fully automatic manner without requiring great manual effort.

SUMMARY OF THE INVENTION

An apparatus for sharpening a beet knife having a plurality of roof-shaped blades next to each other on a knife body has according to the invention a centering device carrying a centering piece and movable in a Y-direction, a milling device with a mechanically rotatable side miller with a roof-like milling edge movable in the Y-direction toward and away from the centering device, and a guide extending in an X-direction substantially perpendicular to the Y-direction. A grab shiftable in the X-direction on the guide is designed to hold the knife to be sharpened, and respective drives are connected to the centering and milling devices for moving same toward and away from each other in the Y-direction and to the grab for moving same along the guide in the X-direction. A controller is connected to the drives for sequentially, from a starting position with the centering device and the milling device spaced from and aligned with each other in the Y-direction, a) moving the grab holding the knife in the X-direction to a position with a first blade of the knife directly between the centering and milling devices, b) advancing the centering device in the Y-direction to bring the centering piece into engagement with a back side of a first blade of the knife;

c) advancing the milling device in the Y-direction to bring the side miller into engagement with the front side of the first blade of the knife, d) milling the first blade of the knife with the side miller, e) moving the centering device and the milling device apart in the Y-direction, f) stepping the grab with the knife in the X-direction through a step equal to a blade width to position a second blade of the knife between the centering and milling devices, and g) repeating steps a) through f) to machine the second blade of the knife.

This mode of operation continues until all of the blades have been processed. The beet knife can then be removed from the grab and another beet knife to be sharpened placed in the grab, with the apparatus being operated as described above in order to sharpen this knife as well.

By virtue of this method and apparatus, it is easily possible to sharpen a beet knife practically completely in a fully automated manner, thus avoiding errors resulting from manual handling and the like. The sharpening process is also accelerated substantially in this way, enabling complete beet knives to be sharpened in a relatively short time. Since the apparatus adjusts itself for each knife, an out-of-true blade is not a problem.

All of the elements of the apparatus can be actuated by an electronic controller with an electronic processor controlling the setting and startup of the corresponding devices. The processor has a memory for storing nominal values regarding the position and depth of cut of the miller, and a comparator for comparing nominal values to actual values, and a connection to the mechanical, pneumatic and/or electrical drives by means of which the centering device, the milling device, the side miller and the grab are moved and operated.

Especially preferably, a provision is made that the centering piece of the centering device can be moved in limited fashion in the X-direction from a spring-loaded middle position to a shifted position deflected against the spring force, with an electrical proximity detector being arranged to detect the shifted position and coupled with an electronic control and/or an electronic memory.

Through this design, it is possible for the centering piece to first be set against the back of the gabled roof-like blade if the beet knife is not yet exactly aligned, with a deflection of the centering piece from the middle position into a shifted position deflected against the force of springs occurring in the + or − X-direction as a result of the inexact alignment. This shifted position deviating from the nominal value is detected and measured by an electronic proximity detector, and the collected data are received by an electronic control and/or stored in an electronic memory. This data stored in the memory, is used to move the grab together with the beet knife in the X-direction into the exact nominal position, so that the exact milling operation can then be executed, because the miller is then in exact alignment with the angularly corrugated roof-like blade. In this position, the centering piece is in the middle position that is detected via the electronic proximity detector and recognized as the nominal position.

In addition, the centering piece of the centering device is placed in an adjustment position directly on the milling edge of the side miller and detects movement of the centering piece out of the middle position into a shifted position as a travel stroke, and the position of the side miller detected in this way is stored in an electronic memory, with this position therefore being the exact working position of the side miller and being stored in the memory as a nominal value.

Moreover, the centering piece sits in the working position on the back of the gabled roof-like blade to be processed, and movement of the centering piece out of the middle position into a shifted position is detected as travel, and the position of the side miller detected in this way is stored in an electronic memory, with this position therefore being the exact working position of the side miller and being stored in the memory as a nominal value.

Furthermore, the centering piece sits in the working position on the back of the gabled roof-like blade to be processed, with a possible position deviation in the X-direction from the nominal position being detected as travel, and a control signal being derived from the deviation via the electronic control, by means of which control signal the grab drive is switched on in the X-direction and the grab is moved into the nominal position.

In addition, in order to perform travel detection between the centering piece and parts of the centering device spaced apart from it in the X-direction, inductive travel sensors are used as proximity detector that are coupled with the electronic controller that processes the detected signal and derives a control command from it for the actuator/drive of the grab.

According to the invention the centering device can be moved in the Y-direction by an electrical drive whose current consumption is monitored so it can be switched off if an amperage is exceeded when the centering device is pressed against a solid obstacle, particularly against the side miller or against the back of the gabled roof-like blade.

In a preferred method for operating an apparatus such as that described above, the centering device is moved in the working position with the centering piece against the back of the milling blade until an increase in current is detected, thus ending the advance of the centering device, and the travel stroke of the centering device is transmitted via an electronic transmitter of the actuator to the control, the collected actual value is compared to the actual value of the null position of the side miller stored in the memory and the control value for moving the side miller in the direction toward the front side of the blade is derived from that, and the milling depth of the side miller is determined.

BRIEF DESCRIPTION OF THE DRAWING

The above and other objects, features, and advantages will become more readily apparent from the following description, reference being made to the accompanying drawing in which:

FIGS. 3A, 3B, 3C, 3D, and 3E respectively show a third step of the work sequence with the apparatus in a front elevational view in FIG. 3A, in a top view in FIG. 3B, in an end view in FIG. 3C, and in FIG. 3D in a large-scale view of the detail shown at 3D in FIG. 3B;

SPECIFIC DESCRIPTION OF THE INVENTION

As seen in the drawings, a beet knife 1 is held by a grab 8 that grips a knife body 9. A centering device 4 and a milling device 5 are both moveable on a machine frame or mount 7 toward and away from each other to either side of the knife 1 in a horizontal front-to-back Y-direction 3. The milling deice 5 has a side miller 6.

As known from U.S. Pat. No. 4,009,637, the beet knife 1 has a plurality of parallel gabled roof-like blades aligned in the Y-direction 3 and that extend over a portion of the width of the beet knife 1 from top to bottom in the view according to FIG. 1A, for example, and that form sharpened cutting edges at their ends pointing downward in FIG. 1A. The grab 8 can be moved on a guide 10 in a horizontal X-direction 2 perpendicular to the Y-direction 3, particularly by a drive in the form of a servomotor 11.

Figure 1A:
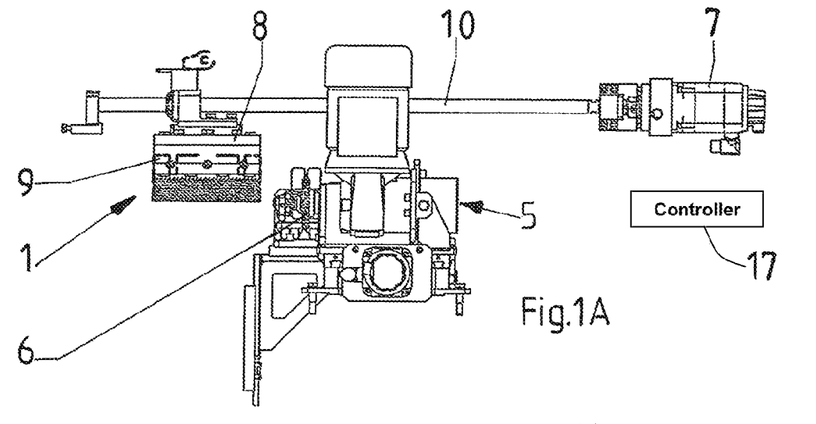
FIGS. 1A, 1B, and 1C show a first step of the work sequence with the apparatus of this invention in a front elevational view in FIG. 1A, in a top view in FIG. 1B, and in FIG. 1C in a large-scale view of detail 1C of FIG. 1B.
Figures 1B, 1C:
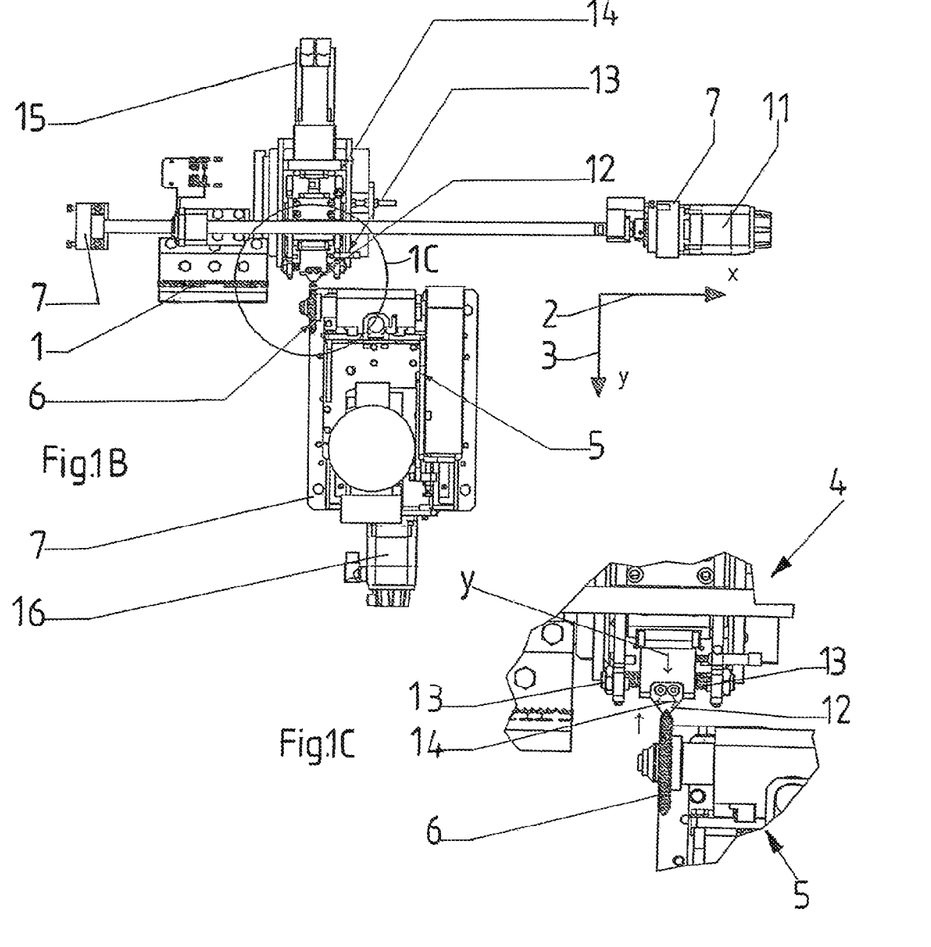
Figure 2A:
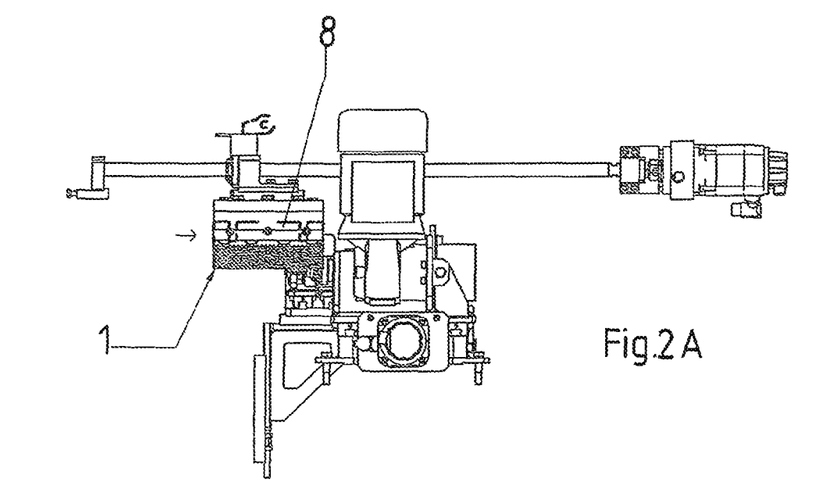
FIGS. 2A, 2B, 2C, and 2D show a second step of the work sequence with the apparatus in a front elevational view in FIG. 2A, in a top view in FIG. 2B, in an end view in FIG. 2C, and in a large-scale view of the detail shown at 2D of FIG. 2B.
Figure 2B:
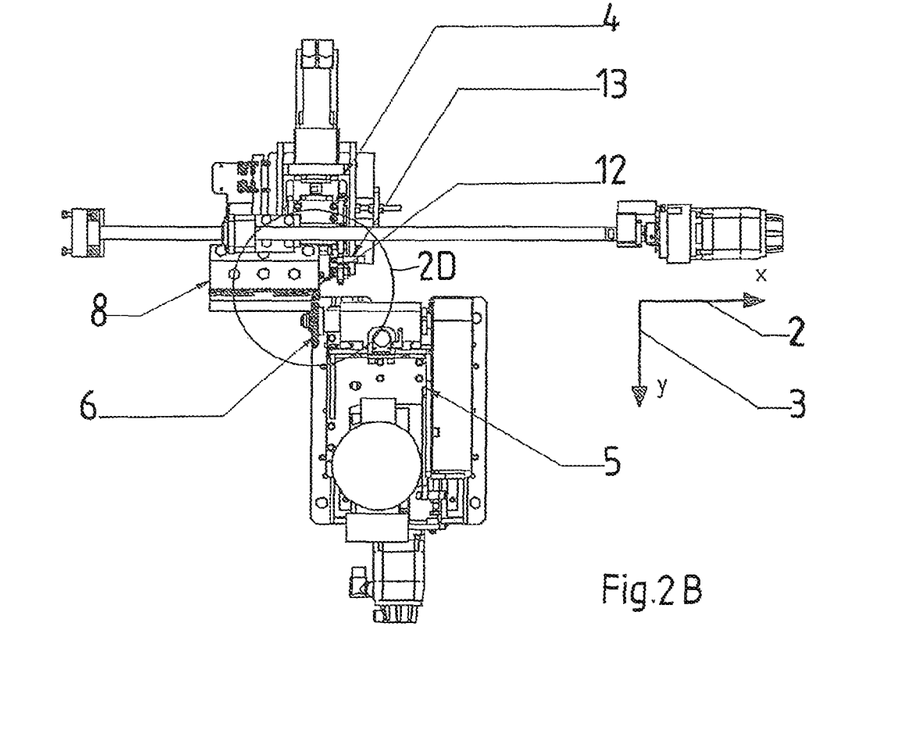
Figure 2C:
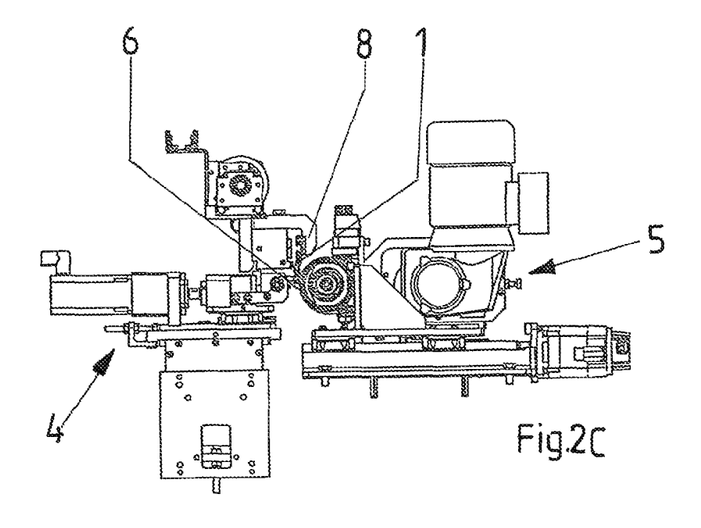
Figure 2D:
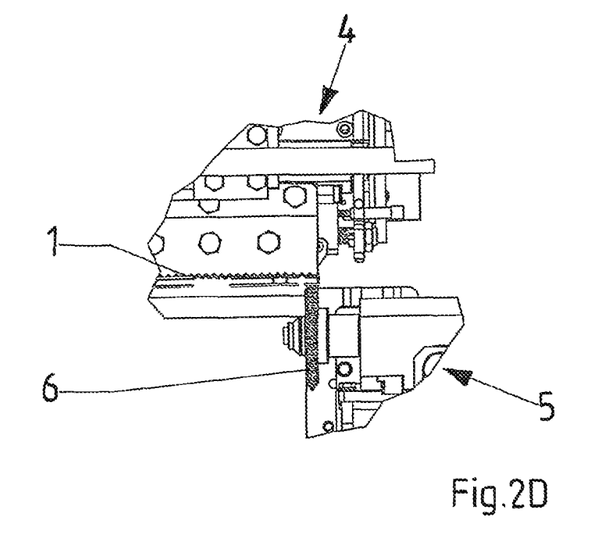
Figure 3A:
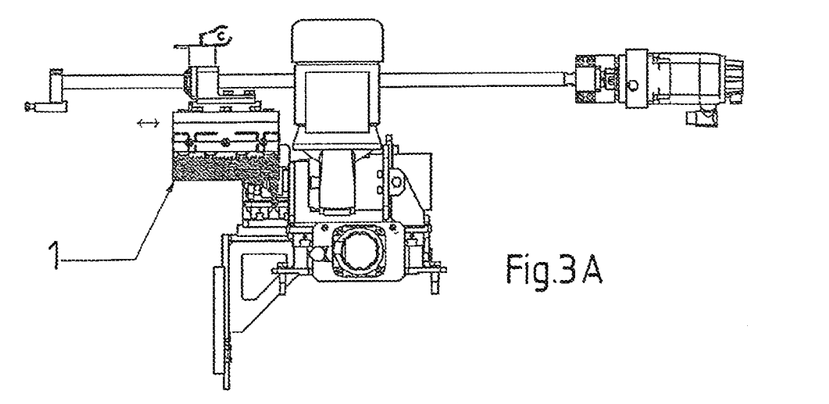
Figure 3B:
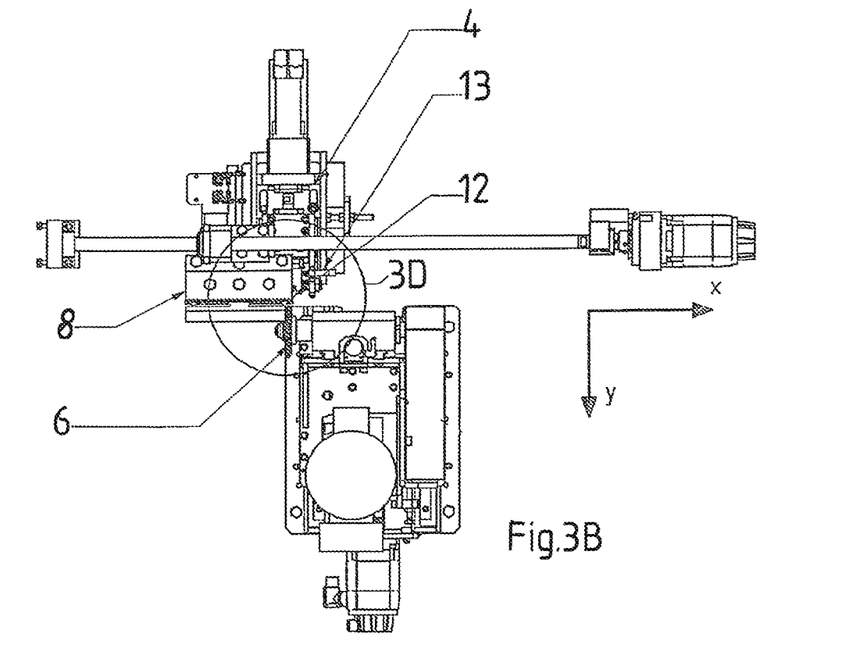
Figure 3C:
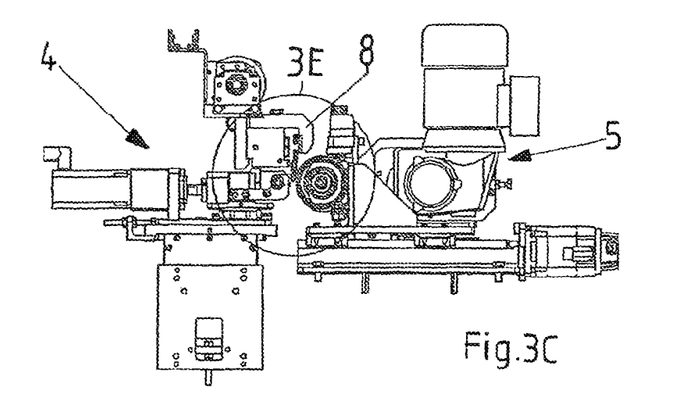
Figure 3D:
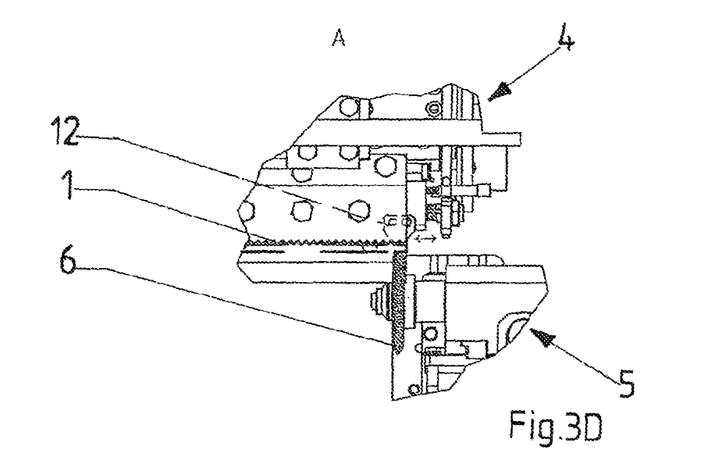
Figure 3E:
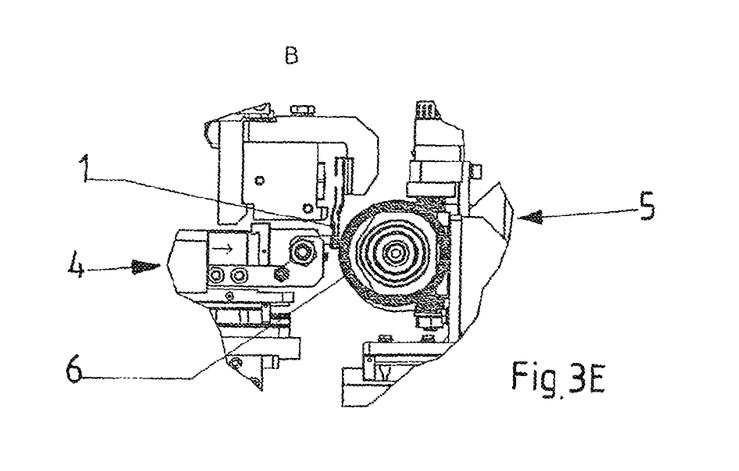

The centering device 4 has a centering piece 12 that is spring mounted for movement transverse to the Y-direction 3 as shown by double-headed arrow 14. A proximity detector 13 is provided between stationary components of the centering device 4 and the moveable centering piece 12, preferably in the form of inductive travel sensors, for detecting the travel stroke or movement of the piece 12 and can be electronically monitored by a controller 17. The mode of operation of the apparatus is as follows:

FIGS. 1A-C show how for setup the null position of the miller 6 is detected and stored in the data processor of a controller 17 of the apparatus as a nominal value to be used for additional milling operations. To detect the null position, the milling device 5 moves in the negative Y-direction 3 to a predetermined position. The centering device 4 moves in the positive Y-direction with the centering piece 12 toward the stationary miller 6. The travel stroke that the centering piece 12 moves through until it comes into contact with the miller 6 is transmitted by its servomotor 15 to the electronic controller 17. The movement of the spring-loaded centering piece 12 transversely to the Y-direction is detected by the proximity detector 13, particularly an inductive travel sensor, and transmitted to the controller 17 as an electronic signal. The exact position and the exact diameter of the miller 6 is thus recognized and stored in the controller 17 as an actual value. This is important for detecting wear of the miller 6. Detection of the null position is performed after every change of miller and upon changing of the operating parameters of the centering device 4.

FIGS. 2A-2D show how the centering device 4 and the milling device 5 are moved away from each other into a starting position in which the beet knife 1 clamped in place by the grab 8 can be moved by that grab 8 into a milling position between the devices 4 and 5. This position is set with a tolerance of plus/minus 1.5 mm. For milling, however, a tolerance of plus/minus 0.05 mm is required. This position is detected in step three shown in FIGS. 3A-3E. Here, the centering device 4 moves in the positive Y-direction with the centering piece 12 into a notch on the back of the beet knife 1. The corresponding roof shape of the centering piece 12 can be seen in FIG. 1C, for example. The gabled roof-like design of the blade of the beet knife 1 corresponds to this roof shape.

As a result of the shapes of the centering piece 12 and of the beet knife 1 engaging with each other, the centering piece 12 moves in the X-direction 2 in the event of a deviation from a nominal centered position. This movement is recorded by the proximity detector 13, i.e. particularly the inductive travel sensor, and transmitted to the controller 17 as a control signal. In the controller 17, this position is compared with the null position of the miller 6. If there is a difference, a control signal is transmitted to the actuator 11 of the grab 8 that is embodied as a servo drive, and the actuator 11 then makes the appropriate correction in the X-direction 2 through appropriate, precise movement of the grab 8. The beet knife 1 is thus moved in the X-direction 2 to the exact centered milling position.

The centering device 4 moves the centering piece 12 into the appropriate roof shape of the beet knife 1 until an increase in current is detected by the electronic controller 17 and the circuit is shut off. As soon as a position is reached in the advance of the centering device 4 in the direction of the is arrow Y at which the current for moving the servomotor 15 increases strongly, the centering device 4 stops. The travel stroke is transmitted via a transmitter of the servomotor 15 to the controller 17. This is compared with the null position of the miller 6 and is used by the milling device 5 as an actual value for the milling depth.

FIGS. 4A to 4E show the machining step in which milling occurs. The milling depth is detected and calculated by the controller 17 in dependence on the desired wall thickness of the beet knife and the travel stroke of the centering device 4 determined in step 3. The centering device 4 can remain in position on the beet knife 1 as a knife support. However, this function can be switched off as desired, depending on the stability of the system.

FIGS. 5A-5E show the next work step. Here, the centering device 4 and the milling device 5 move into the starting position, i.e. spaced from each other, and the grab 8 steps the beet knife 1 by a blade width of the beet knife in the positive X-direction 2, so that the next gabled roof-shaped blade is aligned at least preliminarily with the side miller 6. Further alignment and milling is then performed again according to steps three to five described above. This is done successively one after the other until all of the gabled roof-shaped blades of the beet knife 1 have been processed.

After milling, the finished beet knife 1 is passed by the grab 8 to additional milling or storage stations. For example, a mortise can be produced using the same procedure.

FIGS. 1A-1C illustrate a position in which the beet knife 1 is held by the grab 8 to the left next to the centering device 4 and the milling device 5, since the beet knife 1 is not intended to be in the control path between the devices 4 and 5 during setup. The centering device 4 and the milling device 5 can then be moved closer to each other, as can be seen particularly in FIGS. 1B and 1C, so that the side miller 6 engages in the notch of the centering piece 12 of the centering device 4.

Figure 4A:
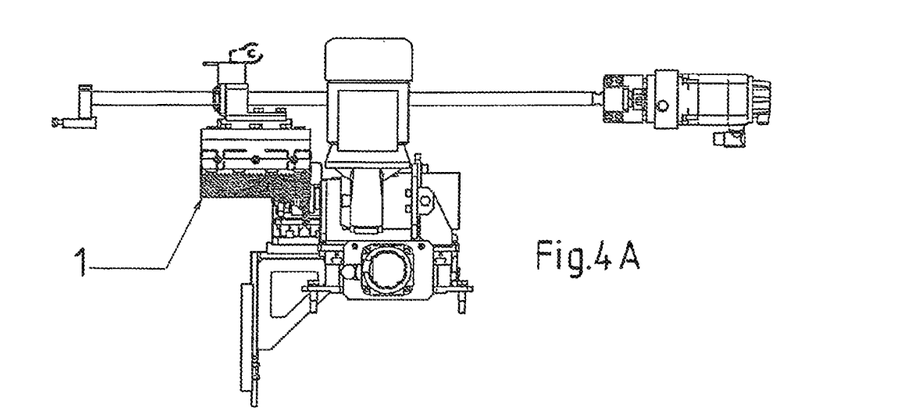
FIGS. 4A, 4B, 4C, 4D, and 4E show a fourth step of the work sequence with the apparatus in a front elevational view in FIG. 4A, in a top view in FIG. 4B, in an end view in FIG. 4C, and in FIG. 4D in a large-scale view of the detail 4D of FIG. 4B, and in FIG. 4E in a large-scale view of the detail 4E of FIG. 4C.
Figure 4B:
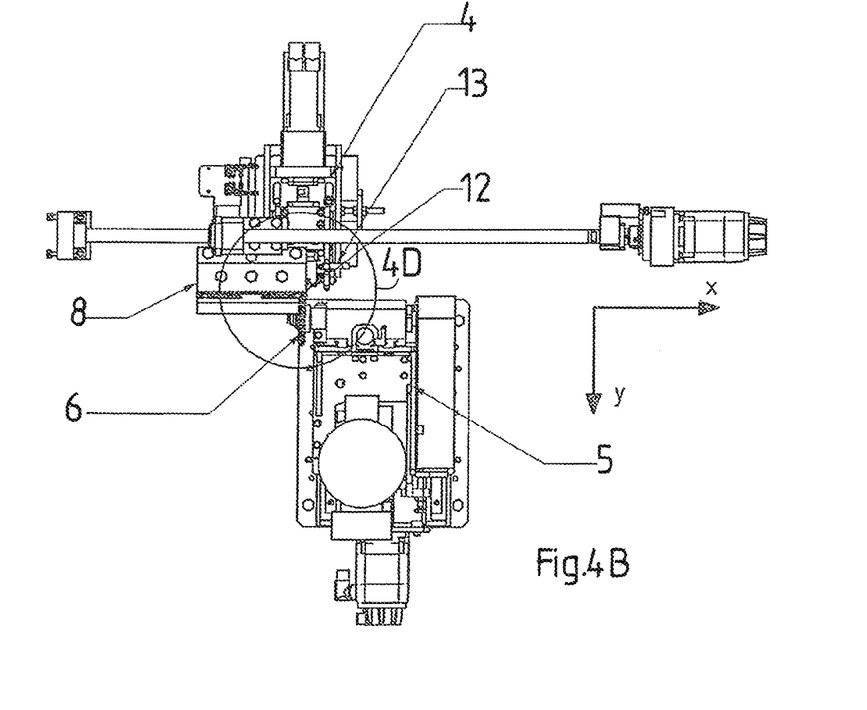
Figure 4C:
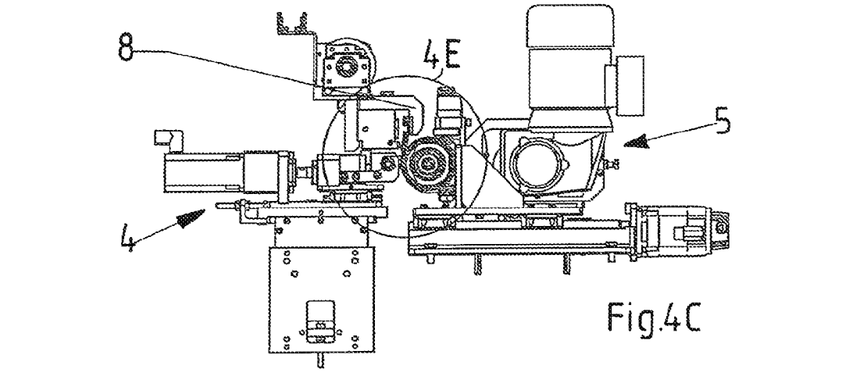
Figure 4D:
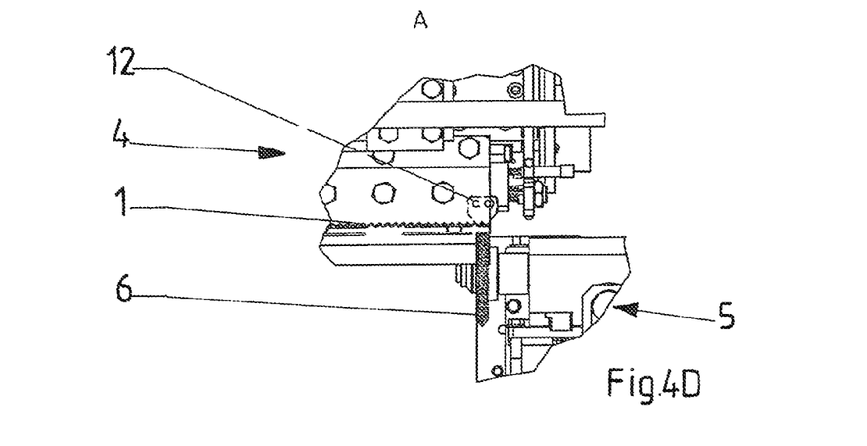
Figure 4E:
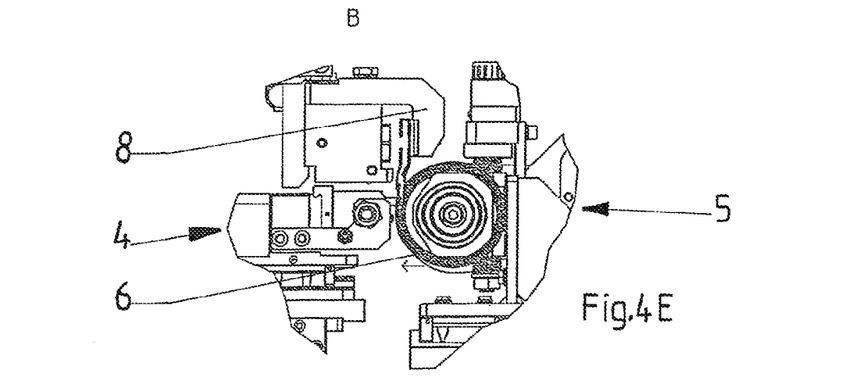

FIGS. 2A-2D show that the beet knife 1 in its milling position. Here, the beet knife 1 is engaged from the back by the centering device 4, particularly by the centering piece 12, in order to determine the actual position of the knife 1. The cutting edge of the beet knife 1 is then aligned with the miller 6. FIGS. 3A-3E show the further adjustment and alignment of the beet knife 1 by the centering device 4, the centering piece 12 and the side miller 6. Subsequently, as shown in FIGS. 4A-4E, the side miller 6 can be started up in order to sharpen the gabled roof-like blade of the beet knife 1 that it is aligned with. The milling process is performed to the predetermined milling depth. FIG. 4D shows that the centering piece 12 is still resting against the back of the gabled roof-like blade of the beet knife 1, and FIG. 4E illustrates with an arrow the movement of the side miller 6 in the direction 3 toward the centering device 4.

Figure 5A:
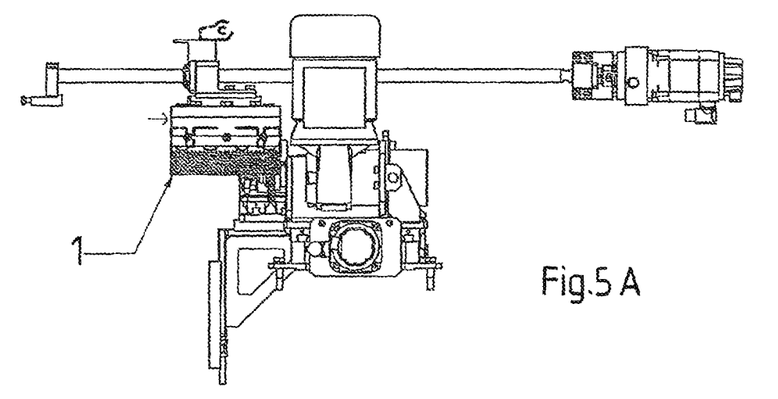
FIGS. 5A, 5B, 5C, 5D, and 5E show a fifth step of the work sequence with the apparatus in a front elevational in FIG. 5A, in a top view in FIG. 5B, in an end view in FIG. 5C, in a large-scale view of the detail shown at 5D in FIG. 5B, and in a large-scale view of the detail shown at 5E in FIG. 5C.
Figure 5B:
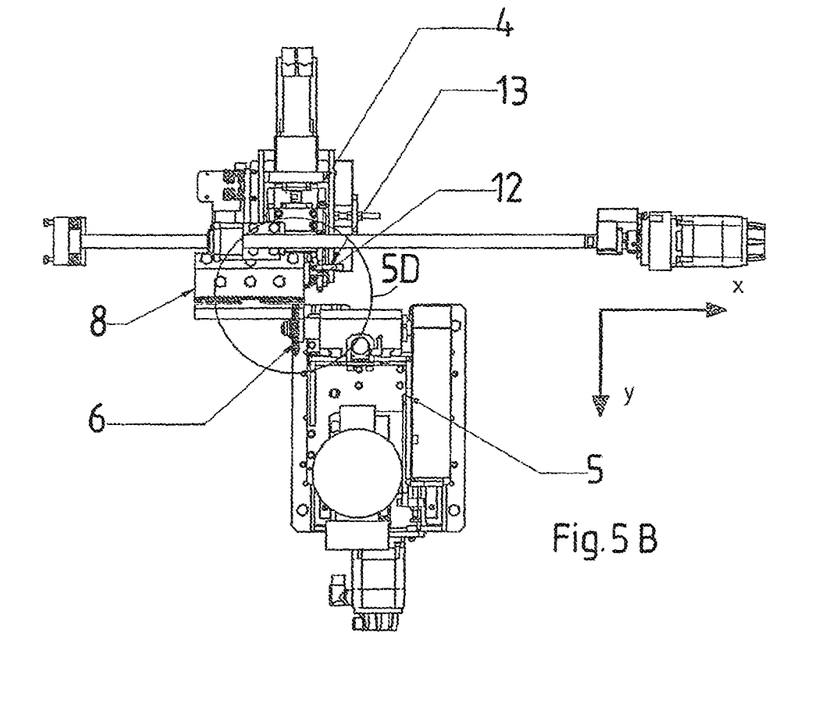
Figure 5C:
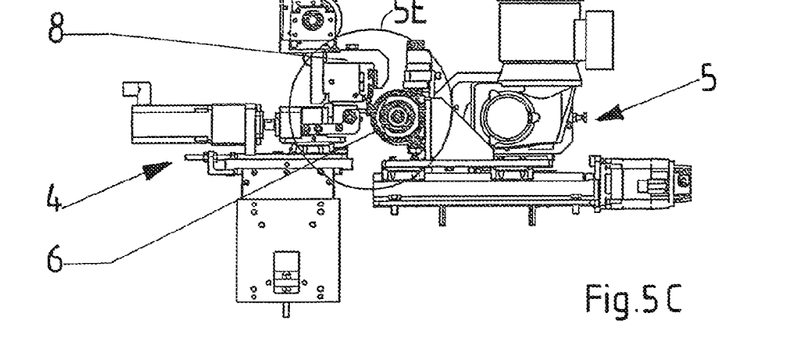
Figure 5D:
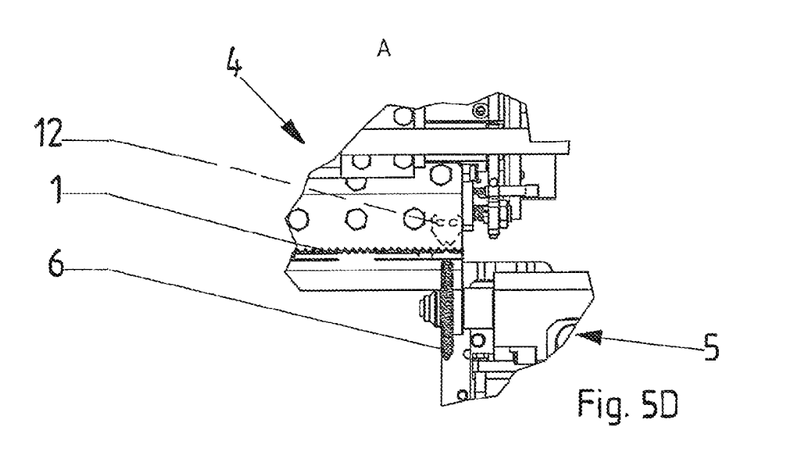
Figure 5E:
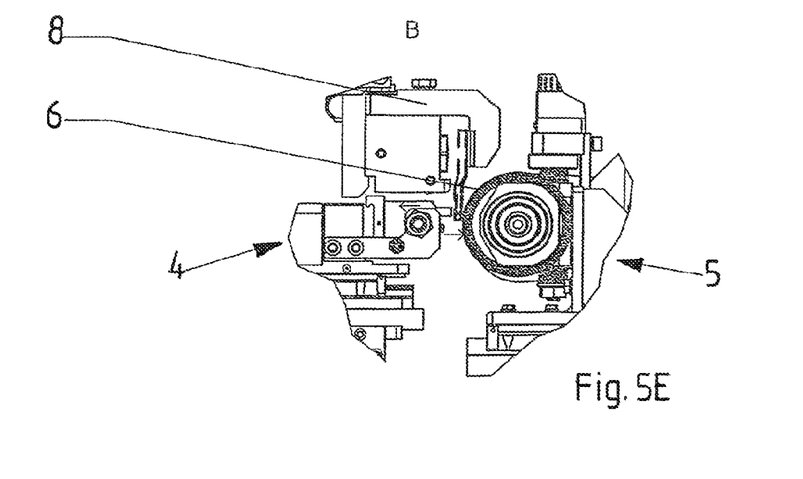

FIGS. 5A-5E show that the centering device 4 and the milling device 5 have returned to the starting position, so that the grab 8 can be moved further by the servomotor 11 by one blade width in the X-direction 2 in order to repeat the steps described above. FIG. 5D shows that both the centering piece 12 and the side miller 6 are moved away from the corresponding gabled roof-like blade, so that the beet knife 1 is released by these elements. Arrows indicating this movement can be seen in FIG. 5E.

The invention is not limited to the illustrated embodiment, but rather can be varied in many ways within the scope of the disclosure. All of the individual and combination features disclosed in the description and/or drawing are regarded as being essential to the invention.

We claim:

1. A method of controlling an apparatus for sharpening a beet knife having a plurality of V-shaped blades next to each other on a knife body, the apparatus comprising:
    a centering device carrying a centering piece and movable in a Y-direction;
    a milling device with a mechanically rotatable side miller with a V-like milling edge movable in the Y-direction toward and away from the centering device;
    a guide extending in an X-direction substantially perpendicular to the Y-direction;
    a grab shiftable in the X-direction on the guide and designed to hold the knife to be sharpened;
    respective drives connected to the centering and milling devices for moving same toward and away from each other in the Y-direction and to the grab for moving same along the guide in the X-direction; and
    control means connected to the drives, the method comprising the steps of sequentially, from a starting position with the centering device and the milling device spaced from and aligned with each other in the Y-direction,
    a) moving the grab holding the knife in the X-direction to a position with a first blade of the knife directly between the centering and milling devices,
    b) advancing the centering device in the Y-direction to bring the centering piece into engagement with a back side of a first blade of the knife;
    c) advancing the milling device in the Y-direction to bring the side miller into engagement with the front side of the first blade of the knife,
    d) milling the first blade of the knife with the side miller,
    e) moving the centering device and the milling device apart in the Y-direction,
    f) stepping the grab with the knife in the X-direction through a step equal to a blade width to position a second blade of the knife between the centering and milling devices, and
    g) repeating steps a) through f) to machine the second blade of the knife.

2. The blade-sharpening method defined in claim 1, wherein the control means is an electronic processor having a memory for storing nominal values, a comparator for comparing nominal values with actual values, and a connection with the drives for moving the centering device, the milling device, the side miller and the grab.

3. The blade-sharpening method defined in claim 1, wherein the centering device can move limitedly in the X-direction from a spring-loaded middle position to a shifted position deflected against a spring force, the method further comprising the step of:

detecting the shifted position with an electrical proximity detector coupled with the control means.

4. The blade-sharpening method defined in claim 3, further comprising, in order to initially calibrate the apparatus the steps of:

$a_1$) moving the centering device in the Y-direction into an adjustment position with the centering piece directly engaging a milling edge of the side miller,     $a_2$) detecting movement of the centering piece from a middle position to a shifted position as a travel stroke,     $a_3$) storing the detected movement of the centering piece in the control means, and     $a_4$) using the stored detected movement as a machining position for the side miller.

5. The blade-sharpening method defined in claim 3, further comprising the steps between steps b) and c) of:

b') detecting movement of the centering piece from the center position,     b'') shifting the grab and the blade in the X-direction such that the centering piece returns to the center position.

6. The blade-sharpening method defined in claim 3, wherein the proximity detector is an inductive travel sensor.

7. The blade-sharpening method defined in claim 1, wherein the drive of the centering device is electrical and the method further comprises the step of:

monitoring with the control means current usage of the centering-device drive and stopping advance of the centering piece in step b) when current usage increases strongly.

\* \* \* \* \*